United States Patent

Wiggerman et al.

[11] Patent Number: 5,583,289
[45] Date of Patent: Dec. 10, 1996

[54] MARINE VELOCITY DETECTION DEVICE WITH CHANNEL TO WASH OUT DEBRIS

[75] Inventors: Ronald E. Wiggerman, McHenry; Craig Gates, Freeport; Dale L. Habbley, Woodstock; Edward J. Hollowed, Naperville, all of Ill.

[73] Assignee: Airguide Instrument Company, Racine, Wis.

[21] Appl. No.: 294,476

[22] Filed: Aug. 19, 1994

[51] Int. Cl.⁶ .................................................. G01P 3/26
[52] U.S. Cl. ............................................................. 73/182
[58] Field of Search ............................................... 73/182

[56] References Cited

U.S. PATENT DOCUMENTS

| | | |
|---|---|---|
| Re. 33,027 | 8/1989 | Danno et al. . |
| 2,627,181 | 2/1953 | Kiekhaefer ............... 73/182 |
| 2,845,796 | 8/1958 | Morison . |
| 2,985,014 | 5/1961 | Doersam . |
| 3,050,998 | 8/1962 | Dahlke . |
| 3,082,623 | 3/1963 | Bosland ................. 73/182 |
| 3,098,384 | 7/1963 | Nusbaum . |
| 3,104,548 | 9/1963 | Thompson . |
| 3,114,261 | 12/1963 | Dillon et al. . |
| 3,190,115 | 6/1965 | Heinsohn . |
| 3,195,351 | 7/1965 | Feldman . |
| 3,226,978 | 1/1966 | Brodick . |
| 3,238,773 | 3/1966 | Leigh . |
| 3,287,968 | 11/1966 | Kenyon . |
| 3,298,230 | 1/1967 | Stover . |
| 3,331,388 | 7/1967 | Evans et al. . |
| 3,338,773 | 8/1967 | Schneider . |
| 3,340,733 | 9/1967 | Lasher . |
| 3,354,714 | 11/1967 | Condon et al. . |
| 3,354,716 | 11/1967 | Wiebe et al. . |
| 3,380,299 | 4/1968 | Seymour . |
| 3,424,000 | 1/1969 | Chelmer et al. . |
| 3,468,163 | 9/1969 | Kenyon . |
| 3,482,444 | 12/1969 | Jefferson . |
| 3,483,506 | 12/1969 | Firsch . |
| 3,489,003 | 1/1970 | Ogg . |
| 3,489,005 | 1/1970 | Ogg . |
| 3,524,348 | 8/1970 | Ogg . |
| 3,541,854 | 11/1970 | Jones et al. . |
| 3,564,917 | 2/1971 | Cronin et al. . |
| 3,623,046 | 11/1971 | Scourtes . |
| 3,641,814 | 2/1972 | DiMaio . |
| 3,643,506 | 2/1972 | Miles . |
| 3,643,639 | 2/1972 | Bier . |
| 3,681,983 | 8/1972 | Alexander . |
| 3,681,987 | 8/1972 | Ruskin . |
| 3,695,103 | 10/1972 | Olson . |
| 3,720,102 | 3/1973 | Ogg . |
| 3,729,993 | 5/1973 | Eck et al. . |
| 3,746,985 | 7/1973 | Perron . |
| 3,765,239 | 10/1973 | Olsson . |
| 3,777,561 | 12/1973 | Lewis . |
| 3,878,714 | 4/1975 | Protta et al. . |
| 3,898,878 | 8/1975 | Stallworth et al. . |

(List continued on next page.)

FOREIGN PATENT DOCUMENTS 699939  11/1953  United Kingdom ............... 73/182

*Primary Examiner*—Richard Chilcot
*Assistant Examiner*—Joseph L. Felber
*Attorney, Agent, or Firm*—Foley & Lardner

[57] ABSTRACT

An apparatus, according to the invention, detects the relative speed of the apparatus with respect to the fluid into which it extends. The apparatus includes a streamlined body portion having an upper end, a lower end, a front edge, a back edge, and a pair of sides. A conduit extends through the body portion and is exposed to the fluid at an orifice located beneath the fluid line. The other end of the conduit is coupled to a pressure transducer which produces an output proportional to the pressure acting on the orifice and thus proportional to the speed of the apparatus relative to the fluid. This apparatus can be connected to an appropriate speedometer and is particularly useful for measuring the speed of a watercraft to which the apparatus is mounted.

20 Claims, 12 Drawing Sheets

Microfiche Appendix Included
(77 Microfiche, 1 Pages)

U.S. PATENT DOCUMENTS

| Number | Date | Name |
|---|---|---|
| 3,910,114 | 10/1975 | Rosaen . |
| 3,940,983 | 3/1976 | Greene . |
| 3,978,725 | 9/1976 | Hadtke . |
| 4,074,570 | 2/1978 | Beilman et al. . |
| 4,083,246 | 4/1978 | Marsh . |
| 4,112,756 | 9/1978 | MacLennan et al. . |
| 4,205,552 | 6/1980 | Refoy . |
| 4,206,637 | 6/1980 | Pankonien . |
| 4,250,745 | 2/1981 | Blatter et al. . |
| 4,271,700 | 6/1981 | Tschanz et al. ............................ 73/182 |
| 4,334,425 | 6/1982 | Crane . |
| 4,481,830 | 11/1984 | Smith et al. . |
| 4,501,288 | 2/1985 | Field . |
| 4,522,179 | 6/1985 | Nishimura et al. . |
| 4,528,846 | 7/1985 | Irwin . |
| 4,534,307 | 8/1985 | Overs . |
| 4,576,476 | 3/1986 | Marshall, II et al. . |
| 4,586,374 | 5/1986 | SaynjaKangas . |
| 4,593,561 | 6/1986 | Gavrilovic . |
| 4,603,579 | 8/1986 | Shaum et al. . |
| 4,611,488 | 9/1986 | Weingart . |
| 4,622,850 | 11/1986 | Gaffrig . |
| 4,653,319 | 3/1987 | Parsonage . |
| 4,713,967 | 12/1987 | Overs et al. . |
| 4,730,485 | 3/1988 | Franklin et al. . |
| 4,821,567 | 4/1989 | Nakamura et al. . |
| 4,825,708 | 5/1989 | Sevick . |
| 4,843,575 | 6/1989 | Crane . |
| 4,848,146 | 7/1989 | Bruno et al. . |
| 4,848,926 | 7/1989 | Jenkins . |
| 4,876,879 | 10/1989 | Ruesch . |
| 4,914,945 | 4/1990 | Nakamura et al. . |
| 4,914,946 | 4/1990 | Nakamura et al. . |
| 4,916,644 | 4/1990 | Nakamura et al. . |
| 4,916,947 | 4/1990 | Suzuki . |
| 4,932,249 | 6/1990 | Nakamura et al. . |
| 4,956,997 | 9/1990 | Nakamura et al. . |
| 5,007,286 | 4/1991 | Malcolm et al. . |
| 5,032,093 | 7/1991 | Bergeron . |
| 5,110,310 | 5/1992 | Hobbs . |
| 5,118,461 | 6/1992 | Fujii . |
| 5,142,473 | 8/1992 | Davis . |
| 5,412,984 | 5/1995 | Okita ............................................ 73/182 |

5,583,289

MARINE VELOCITY DETECTION DEVICE WITH CHANNEL TO WASH OUT DEBRIS

CROSS-REFERENCE TO RELATED APPLICATIONS

The present application contains subject matter similar to the subject matter of the application filed on an even date herewith and assigned to a common owner, entitled "Marine Speedometer."

REFERENCE TO MICROFICHE APPENDIX

This patent application references microfiche Appendix A, having 77 frames having a header listing inventor Ronald Wiggerman, and the title "Marine Speedometer."

NOTICE

A portion of the disclosure in the microfiche appendix contains material which is subject to copyright protection. The copyright owner has no objection to the facsimile reproduction by anyone of the patent disclosure, as it appears in the Patent and Trademark Office's patent files or records, but otherwise reserves all copyrights whatsoever.

FIELD OF THE INVENTION

The present invention relates generally to devices for measuring the speed of fluid flow relative to the device, and particularly to devices that are mounted on watercraft and extend beneath the water line to provide an output signal representative of the relative speed of the watercraft with respect to the water through which it moves.

BACKGROUND OF THE INVENTION

Devices for measuring the speed of watercraft have commonly been used in the past. Typically, such devices are mounted on a boat or other watercraft and include an arm or "pick-up" which extends downward into the water. The output signal from the speedometer pick-up, usually an electrical signal, is converted as needed and provided to a speedometer device, such as an analog speedometer, which can be observed by the operator of the watercraft.

For example, in a series of patents issued to Nakamura et al., U.S. Pat. Nos. 4,914,945, 4,914,946, 4,916,644, 4,932,249, 4,956,997, the outboard motor of a watercraft is provided with a forwardly facing opening which experiences dynamic water pressure when the watercraft moves forward through a body of water. The sensed pressure is transmitted through a conduit to a pressure sensor located towards the front of the watercraft. The pressure sensor produces a signal indicative of the pressure which is converted to a speed for display to an operator. FIG. 7 of the '945 patent shows an alternative speed sensor which is a paddle wheel which is rotated by the water as the boat moves forward to provide an indication of speed.

In Hobbs, U.S. Pat. No. 5,110,310, Davis, U.S. Pat. No. 5,142,473, and Refoy, U.S. Pat. No. 4,205,552, various pitot tubes are disclosed for measuring the speed of a boat with respect to the water through which it travels. Such pitot tubes generally extend downwardly from the boat either at the transom or directly from the hull as shown in Refoy. Such pitot tubes have an open end facing directly in the direction of boat movement. Thus, as the boat picks up speed, more pressure is created in the pitot tube as the water is forced against the open end. A pressure transducer is usually located somewhere in the boat as illustrated by the figure in Refoy, and this transducer provides an output proportional to the pressure. The output may then be converted to an appropriate digital or analog signal which is supplied to a speedometer.

Various problems are inherent in such water pick-up systems. The Nakamura et al. system is an expensive system which requires modification of an outboard motor and long pressure conduits extending between the pick-up and the pressure sensor. In addition to the expense, the long pressure conduits do not work well in certain situations since it takes too much time for the pressure to equalize. Thus, the system is not capable of providing a relatively accurate and instantaneous indication of speed. This type of problem is also manifested in the pitot tube type systems which have a longer pressure conduit than is desired for rapid and accurate indications of relative speed.

Also, long pressure conduits are disadvantageous because ambient air pressure can adversely affect the accuracy of the pressure. Such water pick-up systems often must provide mechanical adjustments to compensate for day to day changes in ambient compensate for day to day changes in ambient pressure.

The prior art water pick-ups also have problems with clogging since they use an unprotected opening pointing in the direction of movement. This opening can become obstructed or completely plugged by sand, dirt, vegetation, and other debris. If the hole becomes obstructed or plugged, the speedometer will provide inaccurate readings to the operator. It is extremely important to avoid this situation particularly in water sport competitions where accurate speed measurement is critical.

A different type of speed indicating device is disclosed in Malcolm et al., U.S. Pat. No. 5,007,286 which uses a housing that extends downward at an incline into the water. The housing includes a dynamic pressure sensing transducer disposed in the end of the housing that extends beneath the water line. This pressure sensing transducer is connected to an electrical connector at the base of the housing via wires passing through a center passage of the housing. In this type of system, the water does not enter a conduit to provide pressure against a transducer, but rather, the water moves through an aperture in the end of the device and acts directly against the pressure transducer. One problem with this type of system is that the pressure transducer required is more expensive since it must work beneath the water line and act directly against the force of the water. Another problem is the housing must be large enough to hold the pressure transducer at the end beneath the water. This can cause a substantial disruption of the wake or surface water quality, such as a "rooster tail", and become a problem, particularly in certain water sports such as competition waterskiing.

SUMMARY OF THE INVENTION

The present invention generally provides an apparatus configured for insertion into a fluid for measuring the speed of the fluid with respect to the apparatus. According to one aspect of the invention, the apparatus is of the type which may be attached to a watercraft to measure the speed of the watercraft relative to the water through which it travels. The apparatus provides an electrical output to a speedometer device representative of the relative velocity of the fluid with respect to the apparatus.

An embodiment of the apparatus includes a streamlined body portion which is configured to extend at least partially below the water line. The body portion includes an upper end, a lower end, a front edge, a back edge, and a pair of sides extending from the front edge to the back edge. When the device is moving relative to the water, the water generally flows past the sides from the front edge to the back edge. The body portion also has a conduit extending therethrough from the upper end generally towards the lower end. The conduit terminates at an orifice disposed in proximity to the front edge where it may be exposed to the fluid when the streamlined body portion is inserted into the fluid.

A pressure transducer is coupled to the conduit at the upper end of the body portion. This transducer provides an output proportional to the pressure in the conduit resulting from movement of the fluid relative to the apparatus. Preferably, the pressure transducer is mounted within a housing that is integral with the streamlined body portion and disposed at its upper end.

According to more specific aspects of the apparatus, the front edge of the body portion is generally rounded to facilitate wash-off of any debris it contacts. Also, the sides of the body portion generally taper to a relatively pointed back edge. This pointed back edge allows the fluid to close after moving past the sides of the streamlined body portion so that minimal disruption of the fluid is caused by the apparatus. Additionally, the front edge is arcuate and generally arcs into closer proximity with the back edge towards the lower end of the body portion. This arcing, in combination with orienting the apparatus at an incline so the lower end trails the upper end as the fluid flows past, provides great cleaning action to prevent any build-up of debris in the orifice of the conduit. According to a particularly preferred embodiment, a channel is also formed in the front edge towards the lower end. The channel includes an upper arcuate region in which the orifice is located to further prevent accumulation of debris in the orifice.

The apparatus also includes a mounting bracket which is pivotably attached to the housing. The mounting bracket may be used, for instance, to attach the apparatus to the transom of a watercraft. At least one wedge-shaped shim is optionally included with the mounting bracket to facilitate mounting the apparatus in proper orientation with the water flow.

The present invention is also related to a marine speedometer for measuring speed of a marine vessel relative to a fluid. The marine speedometer includes an inlet having a short air column exposed to the fluid, a transducer, a control circuit and a display. The transducer is exposed to the short air column and provides an electric signal related to the pressure in the short air column. The control circuit is coupled to the transducer and receives the electric signal and provides a display signal indicative of the speed of the marine vessel. The display is coupled to the control circuit and provides indicia of the speed of the marine vessel in response to the display signal.

The present invention is also related to a marine speedometer system including a probe and a control circuit. The probe includes a short pitot tube, an electronic transducer exposed to the short pitot tube, and an amplifier coupled to the transducer. The control circuit is coupled to the amplifier. The transducer provides an electric signal to the amplifier, the electric signal being indicative of the pressure in the short pitot tube. The amplifier provides an amplified electric signal. The control circuit receives the amplified electric signal and generates a signal indicative of speed.

Further objects and features of the present invention will be apparent from the following specification and claims when considered in connection with the accompanying drawings illustrating the preferred embodiment of the present invention.

DETAILED DESCRIPTION OF THE PREFERRED EXEMPLARY EMBODIMENT

Figure 1:
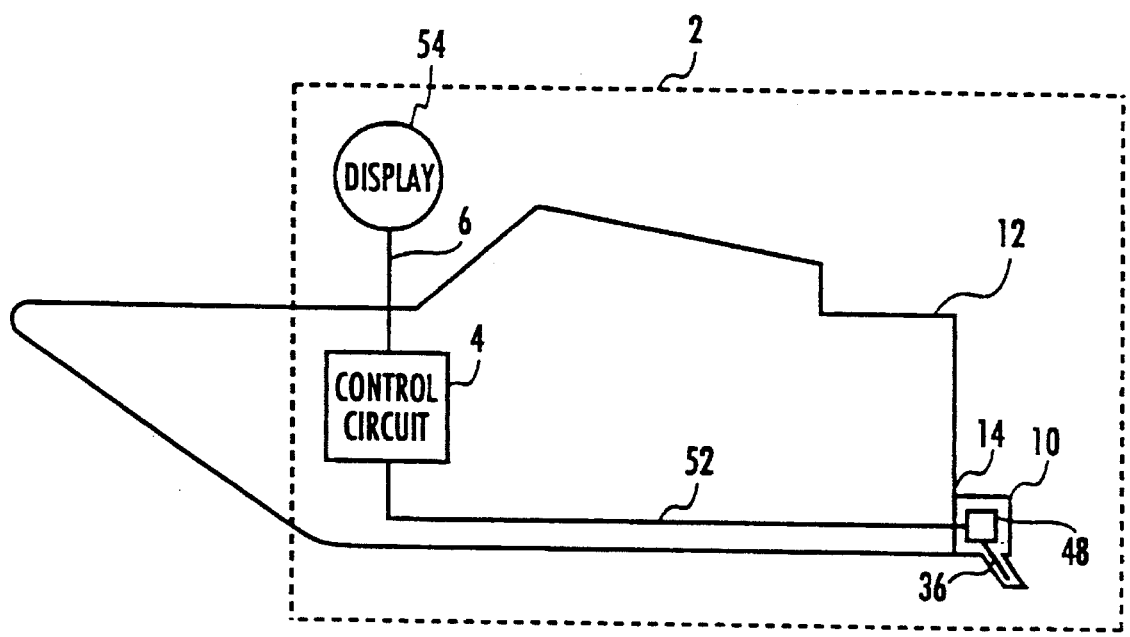
FIG. 1 is a block diagram showing a marine speedometer system in accordance with the preferred embodiment of the invention incorporated on a marine vessel.

FIG. 1 is a schematic diagram of a marine speedometer system 2 in accordance with a preferred exemplary embodiment of the present invention employed on a watercraft 12 (e.g., sailboat, power boat, other marine vessels). Preferably, the watercraft 12 is a high performance waterski boat approved for waterski competitions by the American Water Ski Association (AWSA). The marine speedometer system 2 includes a speed indicator device or a display 54, a control circuit 4, and a speedometer probe or velocity detection device 10. The velocity detection device 10 includes a conduit 36 and a pressure transducer 48. The conduit 36 preferably is a pitot tube having an internal air column. The pressure transducer 48 is directly exposed to the conduit 36. The pressure transducer 48 is electrically coupled to the control circuit 4 via a conductor 52. The display 54 is electrically coupled to the control circuit 4 via a conductor 6. Conductor 52 and conductor 6 may be a single wire conductor or a multi-wire conductor including shielded cable or coaxial cable for noise suppression.

Figure 2:
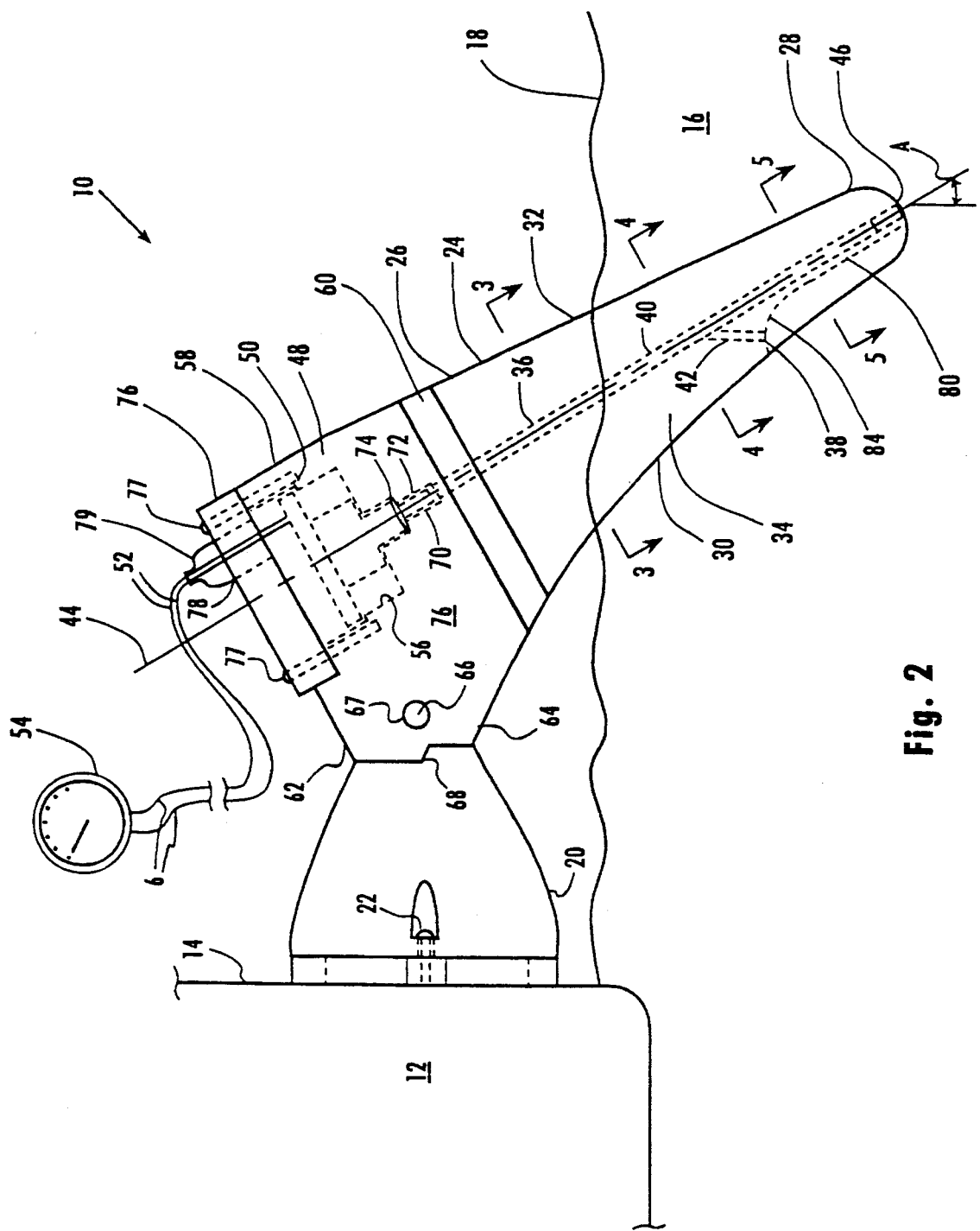
FIG. 2 is a side view of the velocity detection device for use in a speedometer system and mounted to the transom of a watercraft.

Referring generally to FIG. 2, velocity detection device 10 is shown mounted to watercraft 12, and particularly to a mounting surface such as transom 14 of the watercraft. As illustrated, velocity detection device 10 is designed to extend into a fluid 16, such as water, which has an upper level or water line 18.

It should be noted that velocity detection device 10 could be used in a variety of situations. For example, it could be mounted at a fixed point for measuring the velocity of fluid moving past it, or it could be mounted to a moving object, such as a watercraft, to measure the speed at which the watercraft moves through the water. However, as shown in FIG. 2, the most typical use is the latter. Device 10 is mounted to transom 14 of watercraft 12 by a mounting bracket 20 and an appropriate fastening arrangement, such as screws 22. Other types of fasteners, such as bolts, hooks, adhesives, tapes, or integral mounting could also be used.

The preferred embodiment of the velocity detection device 10 will now be described in detail with general reference to FIGS. 2–7. Apparatus 10 includes a streamlined body portion 24 having an upper end 26, a lower end 28, a front edge 30, a back edge 32, and a pair of sides 34 extending generally from front edge 30 to back edge 32. When apparatus 10 is properly oriented for movement relative to fluid 16, fluid 16 generally flows past streamlined body portion 24 from front edge 30 to back edge 32.

Body portion 24 includes a conduit 36 which extends through portion 24 from upper end 26 generally towards lower end 28 and terminates at a hole, an inlet, or an orifice 38 disposed in proximity to front edge 30. Conduit 36 is the passage between orifice 38 and upper end 26 and may take a variety of configurations. However it is preferably made from two conduit portions, a first conduit portion 40 which extends through body portion 24 from upper end 26 to lower end 28 and a second conduit portion 42 which intersects first conduit portion 40 and extends to orifice 38. The part of first conduit portion 40 extending from second conduit portion 42 through lower end 28 is there mainly as a result of manufacturing processes. Orifice 38 is preferably located towards lower end 28 to ensure that it remains below water line 18 when velocity detection device 10 is in use. First conduit portion 40 lies generally along a longitudinal axis 44 that extends through upper end 26 and lower end 28 of body portion 24. Although portion 40 could lie in different orientations, formation of the conduit along longitudinal axis 44 facilitates the manufacturing process since it is typically easier to form conduit portion 40 from lower end 28. (For example, if body portion 24 is molded, a mold pin extending through lower end 28 is used to form conduit portion 40.) A plug 46 is placed in first conduit portion 40 at lower end 28 so that conduit 36 communicates with fluid 16 only through orifice 38. The diameters of conduit portions 40 and 42 can be varied depending on the application, but, generally, conduit portion 40 has a diameter of approximately ⅛ inch and conduit portion 42 has a diameter of approximately ¹⁄₁₆ inch.

Conduit 36 is coupled to a pressure transducer 48 which produces an output signal proportional to the pressure in conduit 36. A variety of pressure transducers 48 can be connected to conduit 36, but the preferred pressure transducer is a solid state piezo-electric transducer, such as the 24PC-CFM2G made by MicroSwitch. The pressure transducer produces an electrical output signal proportional to the pressure in conduit 36 which may need to be amplified by an amplifier 50. Transducer 48 is coupled to a display 54 via conductor 52 and appropriate circuitry which will depend upon the type of display 54 selected. For example, display 54 may have an analog display or a digital display. Display 54 is normally located within craft 12 within the view of the driver or operator.

Figure 7:
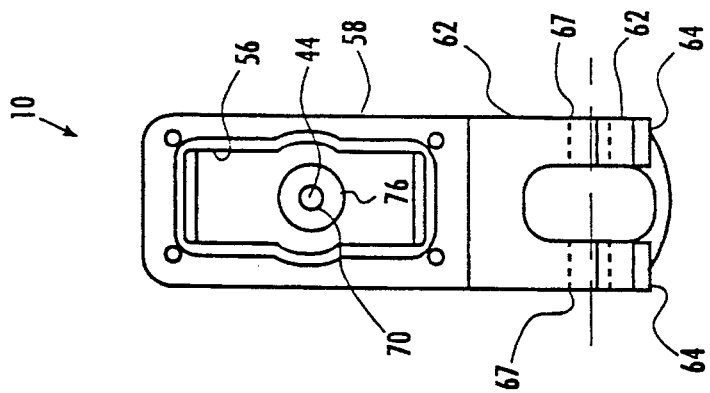
FIG. 7 is generally a top view of the velocity detection device taken downwardly along a longitudinal axis with the mounting bracket removed and showing an empty housing chamber.
Figure 6:
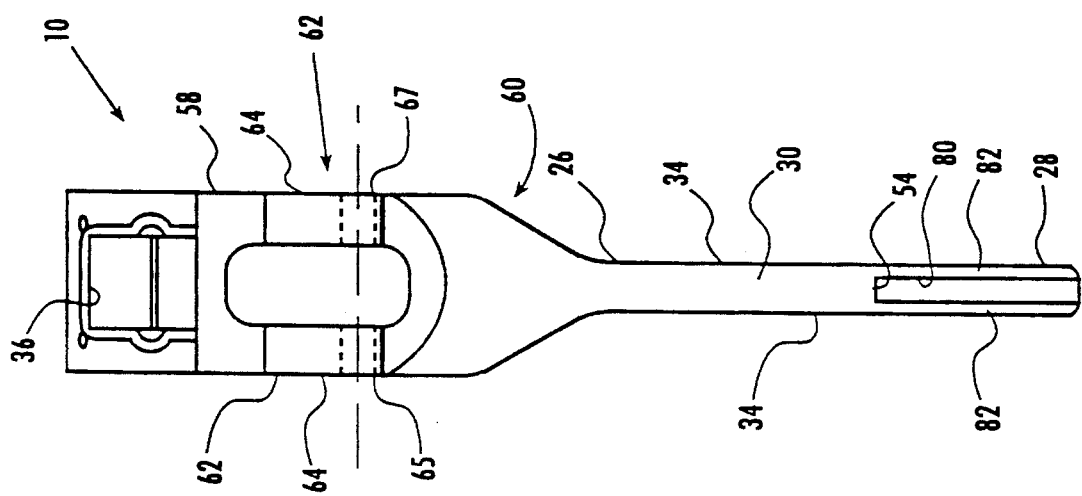
FIG. 6 is a front view of the velocity detection device with the mounting bracket and cover removed.

In the illustrated embodiment, pressure transducer 48 is mounted in a chamber 56 formed in a housing 58 (see FIG. 7 showing chamber 56 without transducer 48 or amplifier 50). Housing 58 is preferably integral with streamlined body portion 24. In the present embodiment, housing 58 is integrally molded with streamlined body portion 24 from the same type of moldable resin as portion 24, such as glass filled 66 nylon, to form a single unitary component. Housing 58 flares out from streamlined body portion 24 at a flared region 60 to allow for a larger chamber 56 capable of containing components such as pressure transducer 48 and amplifier 50. However, as the size of components is reduced, as is often the situation, such a configuration may not be necessary. The amplifier 50 is preferably located near the pressure transducer 48 on a printed circuit board so that the amplified signal may be transmitted across the relatively long conductor 52.

Housing 58 also includes an attachment region 62 configured for connection with mounting bracket 20. Preferably, attachment region 62 includes a pair of flanges 64 between which mounting bracket 20 is received. Flanges 64 and mounting bracket 20 are pivotably connected to one another via a pin 66 extending through corresponding holes 67 in flanges 64 and mounting bracket 20. A spring member 68 is preferably disposed in mounting bracket 20 and acts against attachment region 62 to securely hold housing 58 and body portion 24 in position. However, when body portion 24 strikes a relatively solid object, spring member 68 allows portion 24 to pivot upward about pin 66 to help avoid damage.

Although pressure transducer 48 and amplifier 50 could be located remote from housing 58 and body portion 24, they are preferably disposed in chamber 56 of housing 58 so that conduit 36 may be kept relatively short. Additionally, this arrangement reduces the introduction of noise to the signal produced by transducer 48. The short conduit ensures a quick response time to any change in pressure at orifice 38 so speedometer 54 may provide nearly instantaneous and accurate speed readings. It is preferred that conduit 36 be approximately two inches to twelve inches in length with the most preferred length being in the range from three inches to six inches (i.e., the distance along conduit 36 between orifice 38 and pressure transducer 48). However, conduits having lengths less than two inches or up to three feet in length would also work. For example, conduit 36 may be situated in skegs (not shown) (fins on the bottom of the boat 20) or other housings so that conduit 36 may be less than ½ of an inch in length and reach clean water. Clean water refers to water without bubbles or other abnormal flow which would affect the accuracy of a pressure reading. A short air column, short pitot tube, or short conduit has a length of less than 3 feet. On a more relative scale, a short pitot tube, or short conduit has a length less than the distance from the transducer 48 to the control circuit 4.

To protect against moisture, pressure transducer 48 is sealed with respect to conduit 36. When streamlined body portion 24 and housing 58 are integrally connected, conduit 36 extends along longitudinal axis 44 into housing 58 and includes a threaded region 70 into which a threaded tip 72 of pressure transducer 48 is turned. A flexible o-ring or washer 74 is disposed about threaded tip 72 and is compressed between an annular ridge 76 of chamber 56 and the lower portion of pressure transducer 48 when transducer 48 is threaded into region 70. The o-ring 74 further prevents any movement of fluid from conduit 36 into chamber 56.

A cover 76 is attached to housing 58 by a plurality of fasteners 77, such as screws, although other known fasteners, such as adhesive or snap locks could be used. Cover 76 is disposed over chamber 56 to enclose both amplifier 50 and pressure transducer 48 and to protect them from moisture.

Cover 76 may include an opening 78 through which conductor 52 extend and a flexible boot 79 or sealant disposed over opening 78 to prevent moisture from entering chamber 56 through opening 78.

The shape and orientation of streamlined body portion 24 are also important aspects of device 10. Preferably, front edge 30 extends along the front of housing 58 and along streamlined body portion 24 in a concave, arcuate path. Front edge 30 arcs into closer proximity with longitudinal axis 44 and back edge 32 as it extends towards lower end 28. Thus, the distance separating front edge 30 and back edge 32 decreases moving from upper end 26 to lower end 28. Front edge 30 includes a tunnel 80 formed generally towards lower end 28. Tunnel 80 is recessed and splits front edge 30 into a pair of edges or walls 82 bounding tunnel 80 (see FIG. 6). Tunnel 80 also includes a generally curved top portion 84 from which it arcs downward and extends through lower end 28 generally parallel with longitudinal axis 44. Tunnel 80 extends all the way through lower end 28 to facilitate the wash out of any debris and to prevent cavitation as device 10 moves through the fluid.

Figure 5:
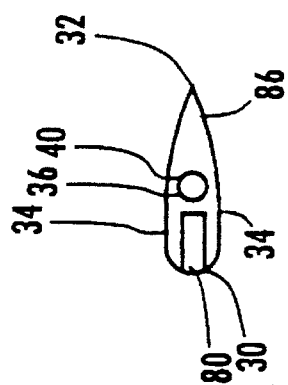
FIG. 5 is a cross-sectional view taken generally along line 5—5 of FIG. 2.
Figure 4:
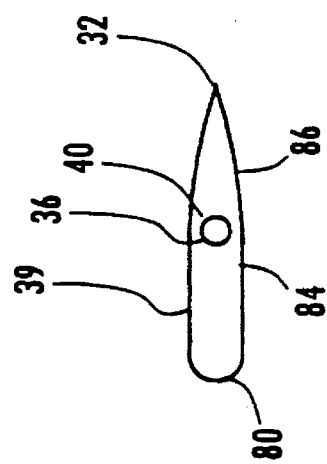
FIG. 4 is a cross-sectional view taken generally along line 4—4 of FIG. 2.
Figure 3:
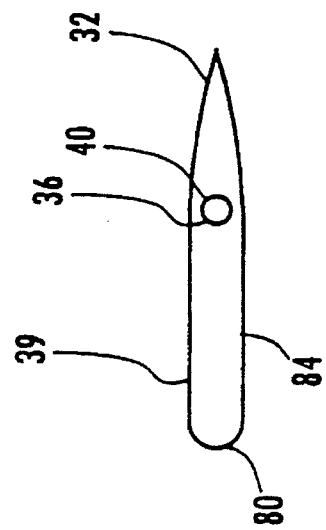
FIG. 3 is a cross-sectional view taken generally along line 3—3 of FIG. 2.

As illustrated more clearly in the cross-sectional views of FIGS. 3–5, front edge 30 is generally rounded. Sides 34 extend back from front edge 30 generally parallel to one another for at least a portion of the distance to back edge 32. However, in closer proximity to back edge 32, sides 34 begin to taper inwardly towards one another to form a tapered region 86. Sides 34 continue to taper inwardly through tapered region 86, preferably along a slightly convex arc, until they meet at the relatively pointed back edge 32.

The orientation and configuration of velocity detection device 10 makes it accurate and reliable. The rounded front edge 30 provides a washing action as device 10 moves with respect to fluid 16. Thus, any weeds or debris which might otherwise get caught by front edge 30 are washed away from device 10. The arc of front edge 30 and angle of axis 44 from a vertical axis also facilitates this washing or cleaning action by allowing the movement of the fluid with respect to device 10 to wash any debris downwardly and away from streamlined body portion 24 and orifice 38.

Velocity detection device 10 is preferably oriented so lower end 28 trails upper end 26 and longitudinal axis 44 is disposed at an "angle A" from vertical (see FIG. 2). Angle A is generally in the range from about 10° to 60°, preferably in the range from about 25° to 40°, and most preferably at about 33°. It should be noted that first conduit portion 40 is disposed at about a 33° angle with second conduit portion 42 so that when angle A is in its preferred range, second conduit portion 42 is substantially vertical, extending from first conduit portion 40 to curved top portion 84 in tunnel 80. This orientation and configuration helps keep orifice 38 free from dirt, sand, weeds, and other debris since orifice 38 does not open directly into the flow of fluid and it is protected by the curvature of the top portion 84.

The configuration of streamlined body portion 24 also minimizes the disruption of the fluid. This can be particularly important when the watercraft 12 is used in various water sports, such as waterskiing, where a person is being towed by the boat. Reducing the spray and wake disturbance allows the waterskier to better concentrate on what he or she is doing. The narrow, streamlined body portion 24 including rounded front edge 30, tapered region 86, and sharp, pointed back edge 32 allows the fluid 16 to move smoothly along sides 34 of body portion 24 and to close along pointed back edge 32 with a minimal disruption of the fluid.

Figure 9:
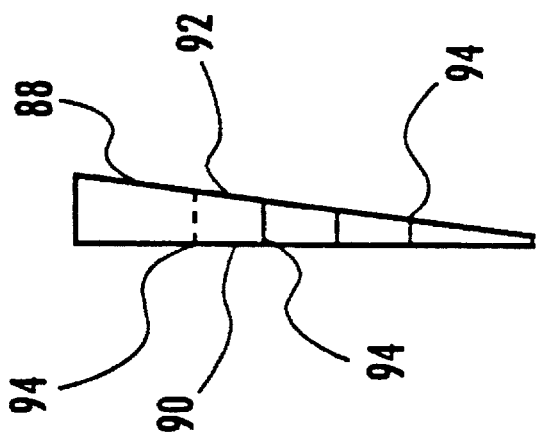
FIG. 9 is an edge view of the shim.
Figure 8:
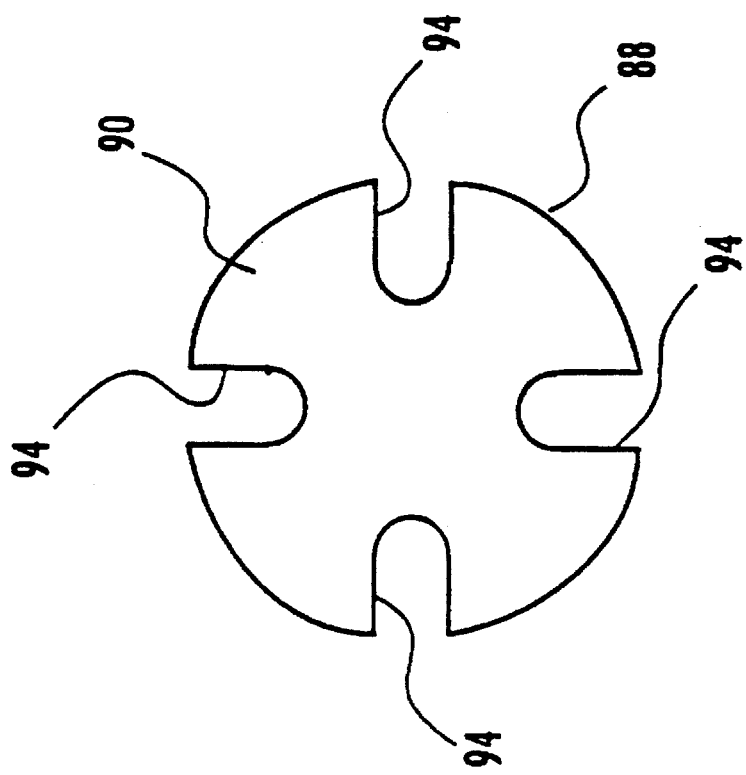
FIG. 8 is a side view of a shim for use in mounting the device.

Referring generally to FIGS. 8 and 9, a shim 88 is illustrated. Shim 88 is used to adjust the orientation of streamlined body portion 24 and is generally disposed between mounting bracket 20 and the object to which velocity detector device 10 is mounted, such as transom 14 of watercraft 12 (see FIG. 2). One or more shims 88 may be used between mounting bracket 20 and transom 14 to properly compensate for transom surfaces which are not perpendicular to the general direction of movement of watercraft 12 with respect to the water.

Each shim has a first surface 90 and a second surface 92 which are angled with respect to each other. This angle can be varied, but the inventors have found that a seven degree angle works well in many applications. Each shim 88 also includes a plurality of cut-out regions 94 through which screws 22 extend into transom 14. Thus, shim 88 can be used to tip velocity detector device 10 and streamlined body portion 24 in a variety of directions until the preferred orientation is obtained, i.e., body portion 24 is generally aligned with the direction of movement with respect to the fluid. Shims 88 can have varying numbers of cut-out regions and more or less incline between the first and second surfaces 90 and 92.

In the typical use of velocity detector device 10, it is mounted to the transom of a watercraft so streamlined body portion 24 extends into the water a sufficient distance to maintain orifice 38 generally beneath the water line 18. As watercraft 12 moves, a given water pressure will be exerted in the area of orifice 38. Water enters orifice 38 to exert the given pressure in conduit 36. The water level in the air column may be less than 0.5 inches from transducer 48 at high speeds such as 40 MPH.

The exerted pressure is transmitted through conduit 36 to pressure transducer 48 which, in turn, produces an output signal proportional to the pressure at orifice 38. Then, depending on which type of display 54 is used, this output signal is amplified by amplifier 50 and converted to an appropriate signal that is readable by speedometer 54. If the operator of watercraft 12 slows the watercraft, the pressure acting on orifice 38 will decrease and the output signal from pressure transducer 48 will decrease a proportional value, thus providing an accurate indication of the new speed of watercraft 12. Similarly, if the operator increases the speed of watercraft 12, the pressure acting on orifice 38 will increase, the pressure acting on pressure transducer 48 will increase, and the output signal produced by pressure transducer 48 will increase a proportional amount, again providing the operator with an accurate indication of his new speed on display 54.

Figure 10:
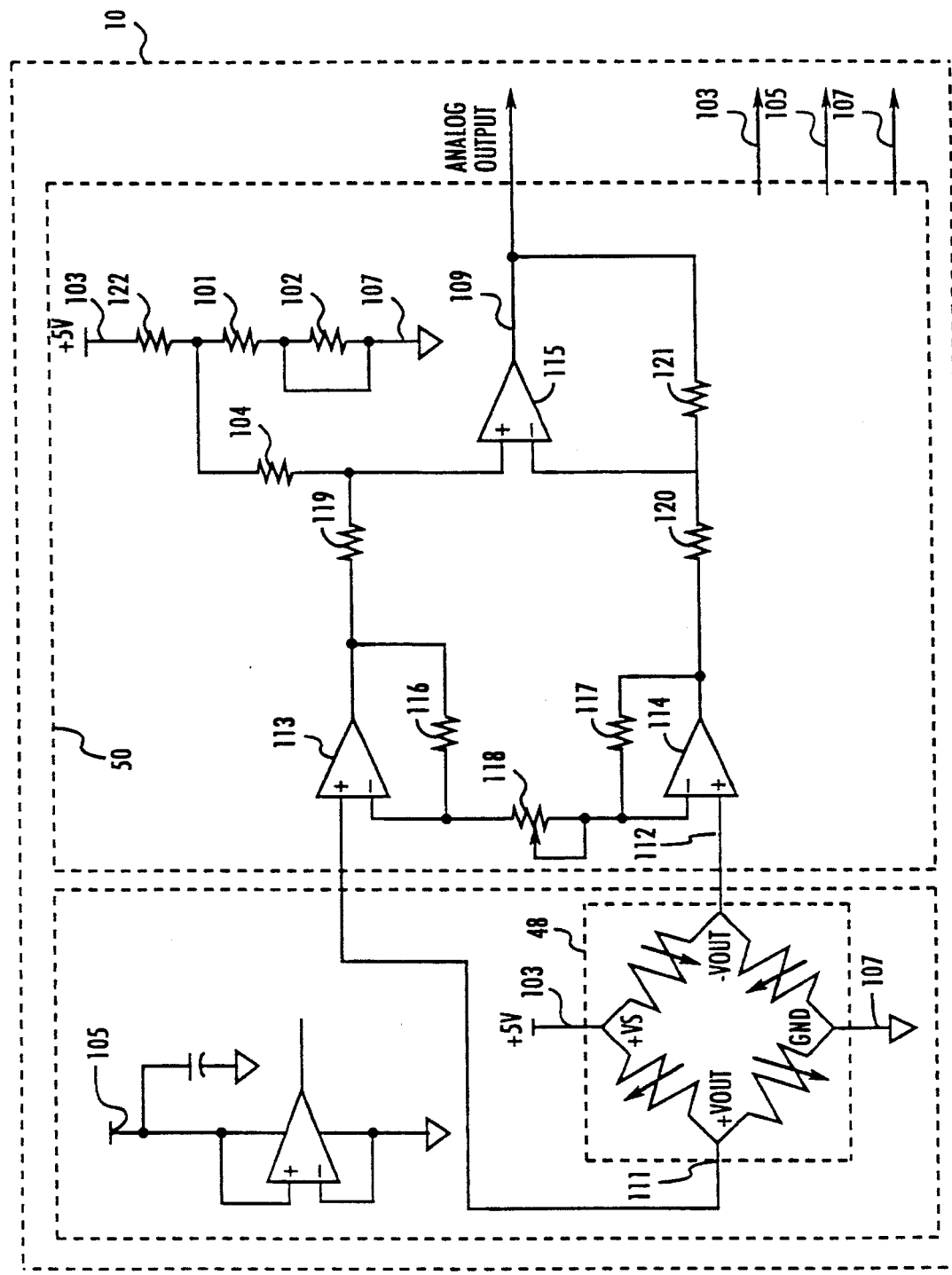
FIG. 10 is an electrical schematic diagram of an amplifier utilized with a pressure transducer positioned in the velocity detection device.
Figure 11A:
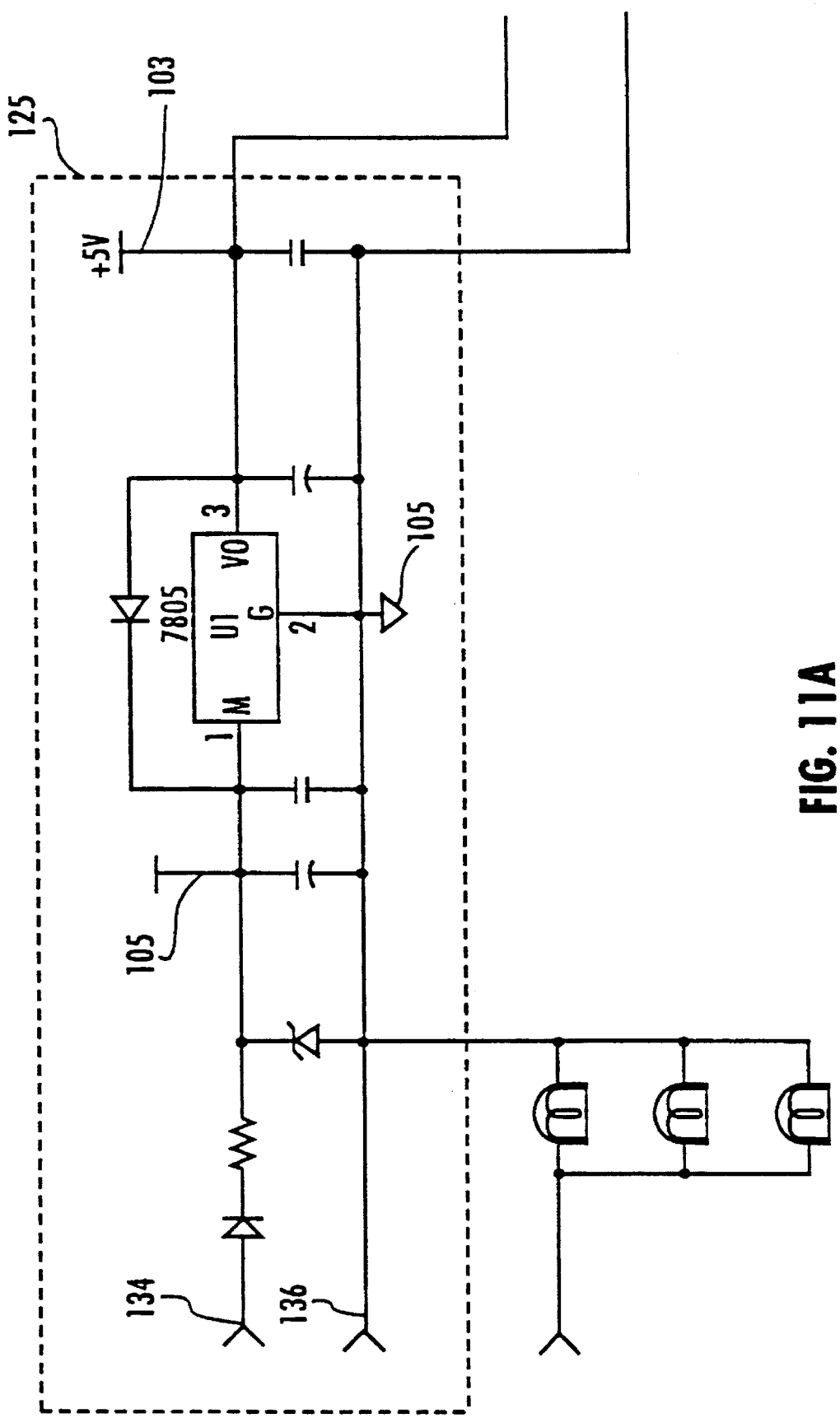
FIG. 11 is an electrical schematic diagram of the control circuit and display of the system.
Figure 11B:
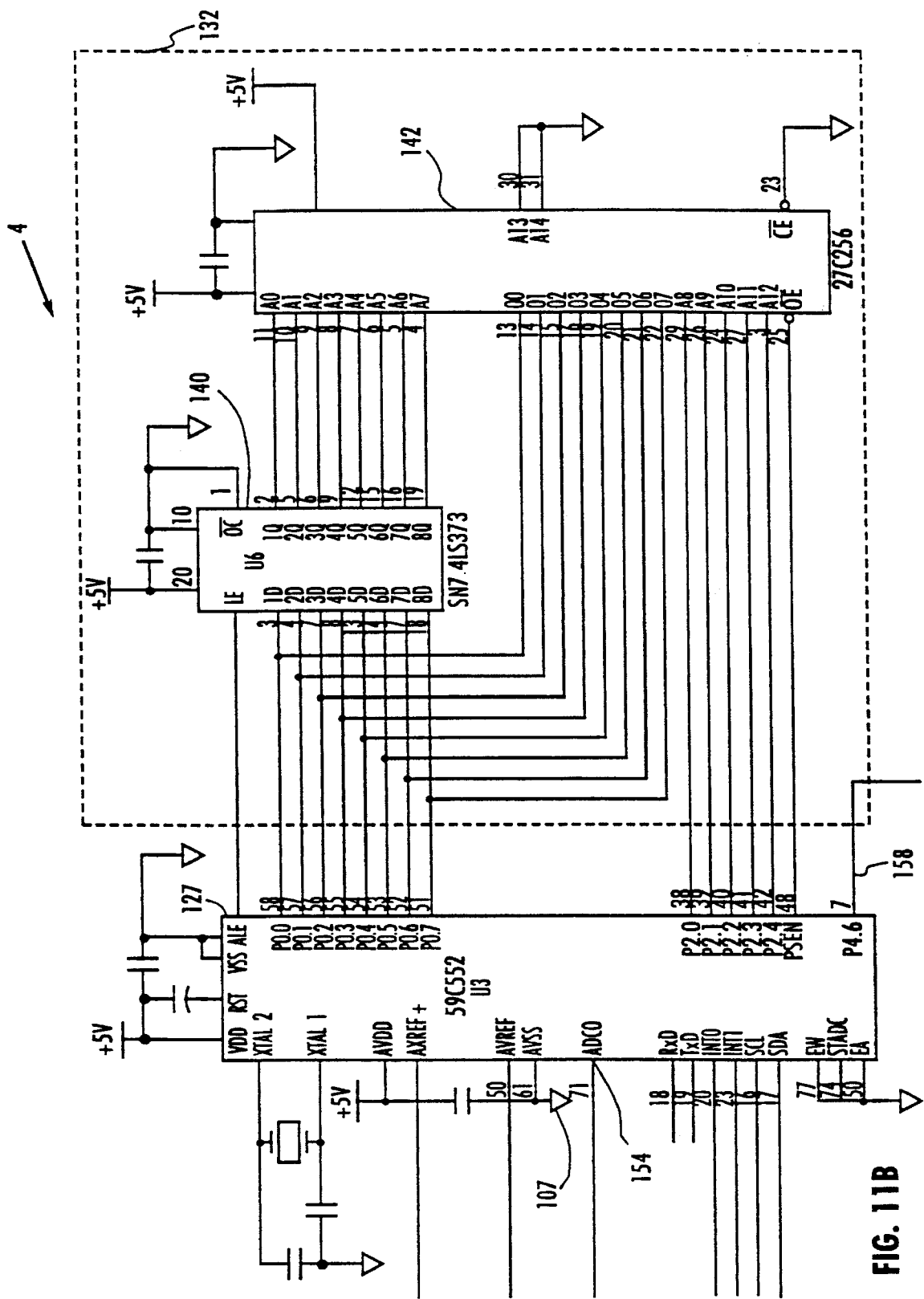
Figure 11C:
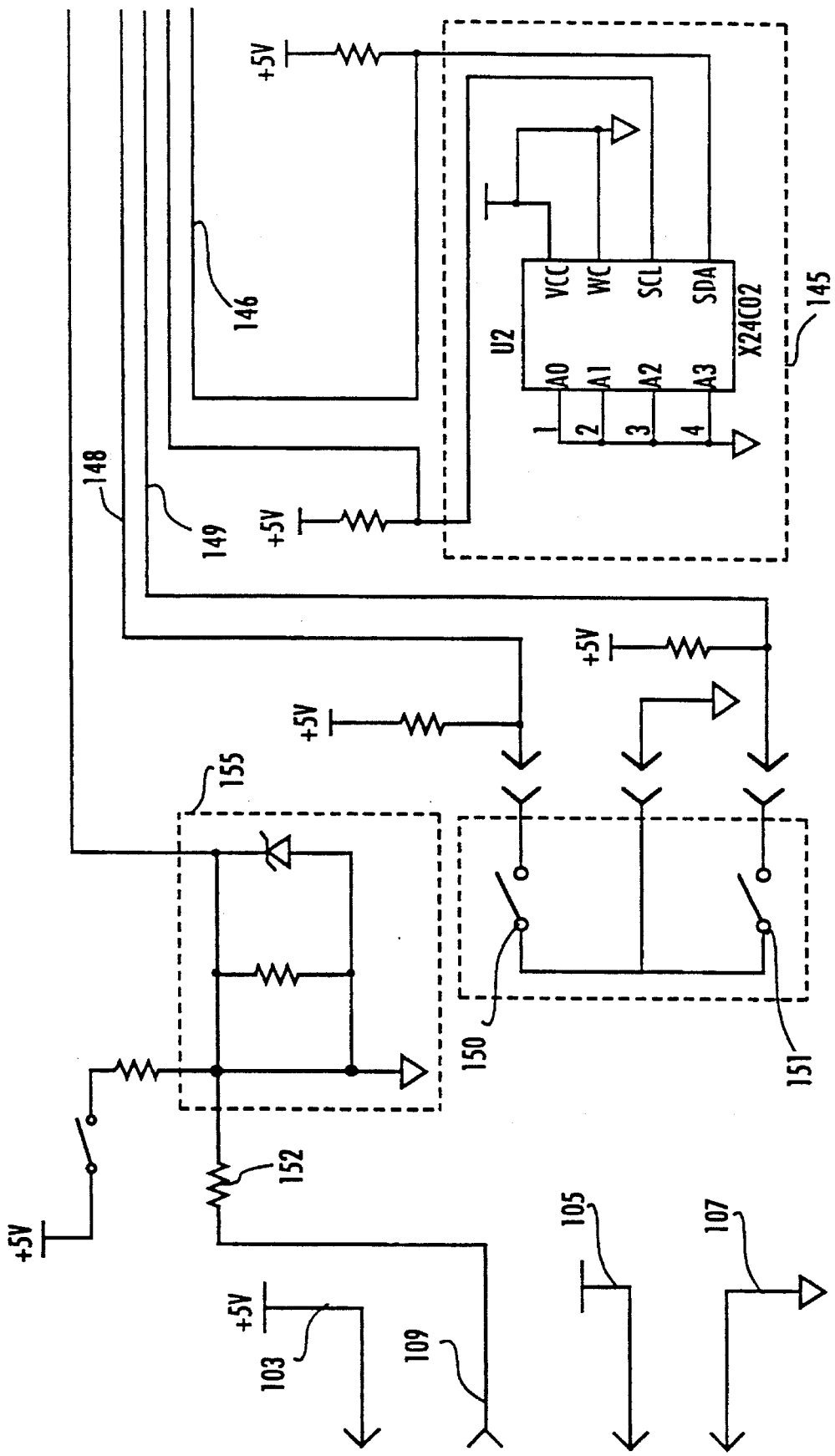
Figure 11D:
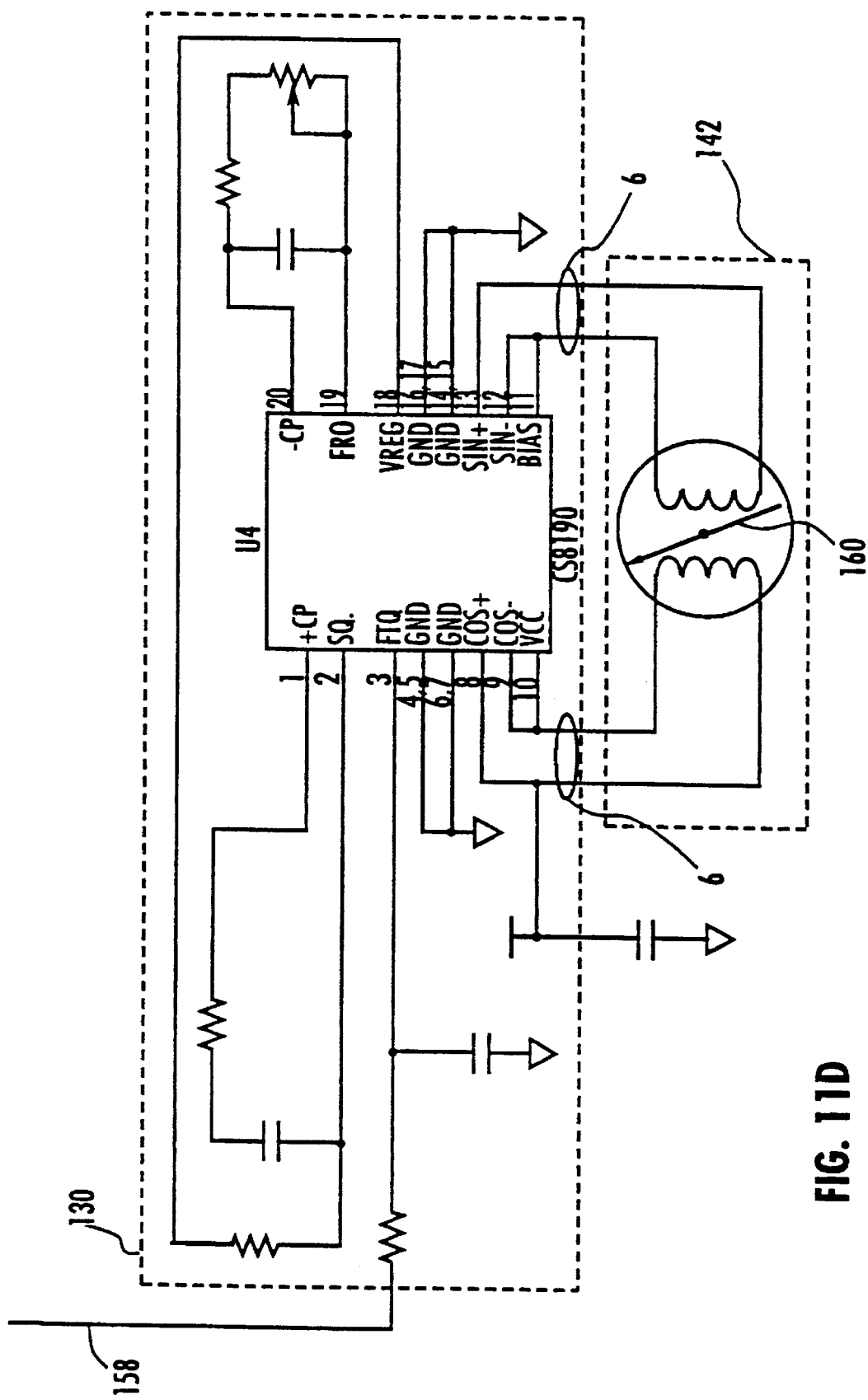

With reference to FIG. 10, the pressure transducer 48 and the amplifier 50 are preferably located within the velocity detection device 10. The pressure transducer 48 and the amplifier 50 receive a 5 V signal from a conductor 103, a ground signal from a conductor 105, and a +12 V battery signal from a conductor 107. Preferably, conductors 103, 105 and 107 are part of conductor 52. Preferably an output conductor 109 is also provided as part of conductor 52.

The pressure transducer 48 preferably includes a positive output 111 and a negative output 112. The pressure transducer 54 includes power terminals coupled between the conductor 103 and the conductor 107.

The amplifier 50 preferably includes an amplifier 113, an amplifier 114, and an amplifier 115. Amplifiers 113, 114, and 115 are preferably LM342AD operational amplifiers manufactured by Motorola. Preferably, amplifier 50 is situated in the device 10 on a FR4 PC board. The amplifier 50 may be potted or sealed in a resin or other substance. The sealing of the amplifier provides protection from vibration and moisture.

The non-inverting input of amplifier 113 is coupled to the positive output 111, and the non-inverting input of the amplifier 114 is coupled to the negative output 112. The inverting input of the amplifier 113 is coupled to a first end of a resistor 116 and a first end of a potentiometer 118. A second end of the potentiometer 118 is coupled to the wiper of the potentiometer 118 and to the inverting input of the amplifier 114. A first end of a resistor 117 is coupled to the second end of the potentiometer 118. The output of the amplifier 114 is coupled to a second end of the resistor 117 and a first end of a resistor 120. The output of the amplifier 113 is coupled to a second end of the resistor 116 and a first end of a resistor 119.

A second end of the resistor 119 is coupled to a first end of a resistor 104 and the non-inverting input of the amplifier 115. A second end of the resistor 120 is coupled to a first end of a resistor 121 and the inverting input of the amplifier 115. A second end of the resistor 104 is coupled to a first end of a resistor 122 and a first end of a resistor 101. A second end of the resistor 122 is coupled to the conductor 103. A second end of the resistor 101 is coupled to a first end of a resistor 102. The first end of the resistor 102 is coupled to a jumper 100 which is coupled to the conductor 107. A second end of the resistor 102 is coupled to the conductor 107. A second end of the resistor 121 is coupled to the output of the amplifier 115 and the output conductor 109.

The amplifier 50 preferably provides a differential amplifier for amplifying the voltage difference between the positive output 111 and the negative output 112 of the pressure transducer 48. Amplifiers 113 and 114, resistors 116 and 117, and the potentiometer 118 provide a gain of approximately 20 from the outputs 112 and 111 to the outputs of the amplifiers 113 and 114. Resistors 119, 120, 121 and 124 and the amplifier 115 preferably provide a gain of 1.5.

Resistors 122, 101 and 102 provide a DC offset for the amplifier 115 which forces the output of the amplifier 115 to provide 0.5 volts when a zero voltage difference exists between the positive output 111 and the negative output 112. The jumper 100 allows the DC offset to be adjusted during the manufacture of the system 2. Preferably, the amplifier 115 provides an analog electric signal that the output conductor 109 which is referenced to ground. The potentiometer 118 allows the gain of the amplifier to be adjusted or calibrated during manufacture of the system 2.

The operation of the pressure transducer 48 and amplifier 50 is described as follows. The pressure transducer 48 provides an electrical signal in response to the pressure in the conduit 36 (FIG. 2). The electrical signal is provided across the positive output 111 and the negative output 112. The amplifier 50 receives a signal across the outputs 111 and 112 and provides an amplified electrical signal at the output 109 ranging from 0.5 to 5.0 volts. More specifically, the amplifiers 113 and 114 provide an amplified signal to the amplifier 115. The amplifier 115 provides an electric analog signal at the output 109. The amplifier 50 is preferably calibrated via the potentiometer 118 to provide a 3.6 V signal at the output conductor 109 when the transducer 48 is exposed to a pressure of 15 psi.

With reference to FIG. 11, an electrical schematic of the control circuit 4 in accordance with the preferred exemplary embodiment of the present invention is shown. The control circuit 4 is preferably located proximate the driver (not shown) of the watercraft 12 and includes a power supply circuit 125, a microcontroller 127, a display driver 130, and a look-up table 132. The display driver 130 is preferably a CS8190 manufactured by Cherry Semiconductor, Inc.

The power supply circuit 125 is coupled to a positive terminal 134 and a negative terminal 136 of the battery (not shown) of the watercraft 12. The power supply circuit 125 provides the 5 V signal at the conductor 103, the ground signal at the conductor, and the +12 V battery signal at the conductor 107.

Control circuit 4 is preferably a digital circuit. Control circuit 4 preferably utilizes the microcontroller 127 which may be advantageously configured for integration with other watercraft 12 controls such as speed controls. The microcontroller 127 advantageously allows convenient automatic and manual adjustment of the speed signal with minimal external hardware.

The microcontroller 127 runs a software program for implementing the marine speedometer operations. The microcontroller 127 is preferably an 80C552 microcontroller manufactured by Signetics Inc. or other microprocessor. The various resistors and capacitors coupled to the microcontroller 127 are known in the art and described in data sheets related to the microcontroller 127.

The look up table 132 preferably includes a latch 140 and a PROM 142. The PROM 142 is preferably an EPROM programmed during the manufacture of the marine speedometer system 2. The PROM 142 is preferably a 27C256 manufactured by INTEL Corp.

A serial memory 145 is coupled to an input/output 146 of the microcontroller 127. The serial memory 145 includes an X24C02 integrated circuit manufactured by XICOR Inc. The serial memory 145 is an EEPROM which stores a calibration offset value on the input/output 146 for the microcontroller 127.

The microcontroller 127 receives a calibrate down signal at an input 148 from a momentary switch 150 and a calibrate up signal at an input 149 from a momentary switch 151. The sum of the calibrate up and calibrate down signals are stored as the calibration offset value in the serial memory 145 and in a scratch pad RAM of the microcontroller 127.

The microcontroller 127 receives an analog electric signal from the amplifier 50 at the output conductor 109 indicative of the pressure in the conduit 36. The analog electric signal at the output conductor 109 is provided across a resistor 152 and through a circuit 155 to an analog input 154 of the microcontroller 127. The circuit 155 provides a voltage clamp to prevent the voltage at the output conductor 109 from exceeding 5 V.

The microcontroller 127 includes an internal analog-to-digital (A/D) converter (not shown) for converting the signal at the analog input 154 to a digital value. The microcontroller 127 utilizes the digital value to provide a digital output (address), indicative of the pressure sensed in the conduit 36, to the look-up table 132. The digital output addresses the look-up table 132.

The look-up table 132 utilizes a lache 105 to address the PROM 142 while receiving data from the PROM 142. The look-up table 132 provides a converted digital signal indicative of the speed of the watercraft 12 in response to the digital output from the microcontroller 127. The microcontroller 127 provides a display signal (frequency signal) indicative of the speed of the watercraft 12 in response to the converted digital signal to the display driver 130 at an output 158. The microcontroller 127 may require multiple accesses of the look-up table 132 to receive the appropriate converted digital signal.

The display driver 130 provides sine wave signals to the display 54 in response to the display signal across the conductor 6. The display 54 is preferably an air core meter which includes an indicator or a needle 160. The needle 160 moves in response to the sine wave signals provided on the conductor 6 from the display driver 130.

The look-up table 132 preferably stores T-Buoy values and count values. The T-Buoy values and count values are stored in locations addressed by the digital output generated from the digital value provided by internal A/D converter of the microcontroller 127.

T-Buoy values represent the speed or rate as a time value. T-Buoy values represent the amount of time for the watercraft 12 to travel from a starting buoy to a test buoy. For example, if the distance between the starting buoy and the test buoy were 849.74 feet, and the rate at which the watercraft 12 should travel from the start buoy to the T-Buoy is 36 MPH, the watercraft 12 should take 16.09 seconds to reach the T-Buoy. The 16.09 T-Buoy value is located in the location in look-up table 88 which is addressed by the digital value of the internal A/D converter representing 36 MPH. The T-Buoy values are selected for particular lengths from the starting Buoy to the T-Buoy. The AWSA provides suggested T-Buoy lengths, times and rates. Preferably, the look-up table 132 includes T-Buoy values for a course of 849.74 and for the watercraft 12 traveling at 36 MPH.

Count values indicate the frequency of the display signal (square wave signal) produced at the output 81. The count value is loaded into an internal timer (not shown) in the microprocessor 127. The internal timer produces the square wave at the particular frequency indicated by the count value. The T-Buoy and count values have been adjusted through trial and error for appropriate readings of the speedometer system 2.

The T-Buoy values and count values are representative of a particular MPH reading on the display 54. For example, the digital value representing approximately 0 MPH addresses a location having a T-Buoy value of FFFFH and a count value of EFFFH. Similarly, a digital output of 99 H is equal to approximately 19.3271 MPH. The digital output 99 H addresses a location having a T-Buoy value of 02576 H and a count value of 0294 H. The values for the look-up table 132 are provided in Appendix A.

A software program residing in microcontroller 127 converts the analog electric signal at the analog input 154 to the display signal at the output 158. The software program in microfiche Appendix A is written in MCS-51 macro assembler code for implementing the preferred operations of the speedometer system 2. The operation of the program in microfiche Appendix A is generally described as follows with reference to FIGS. 1–11.

The software program is used to convert the analog electric signal at the analog input 154 of the microcontroller 127 to a display signal at an output frequency which corresponds to a specific MPH reading at the output 84. The needle 160 on the display 54 indicates the specific MPH reading in response to the display driver 130 receiving the specific frequency (the display signal) at the output 158.

The software program generally includes an initialization subroutine, a self-test subroutine, an auto zeroing subroutine, a debug subroutine, and a conversion subroutine.

The initialization subroutine sets up the proper configuration of the stack pointer, the timer, the interrupts, and the flags in the microcontroller 127. The self-test subroutine performs a test of the internal RAM of the microcontroller 154, a check sum of the PROM 142, and a test of the serial memory 145. Specifically, the cells of the serial memory 145 are checked as well as the signals on the control lines of the serial memory 145.

The debug subroutine is used for testing and troubleshooting the speedometer system 2. The testing is preferably accomplished through the RS-232 communication port on the microcontroller 154.

The auto-zero routine calculates an auto-zero calibration constant. At start-up (when the system 2 is turned ON), the software samples the analog input 154 thirty-two times over a two second period. The microcontroller 127 calculates an average value from the thirty samples of digital value from the A/D converter. The average value is stored in the scratch pad RAM of the microcontroller 94 as the auto-zero calibration constant. The auto-zero calibration constant is used during the conversion subroutine to adjust the display signal at output 81. The auto-zero calibration constant provides an indication of the reading at the input 154 when the watercraft 12 is traveling 0 MPH. The auto-zero calibration constant advantageously and automatically adjusts the speedometer system 2 for the particular watercraft 12, the particular mounting of the velocity detection device 10, and the ambient pressure.

The conversion subroutine converts the analog electric signal at the analog input 154 from the output conductor 109 to a specific frequency (display signal) which corresponds to an MPH reading on the display 54. The program utilizes the look-up table 132 to convert the analog electric signal to a frequency. The conversion routine reads the digital value from the internal A/D converter coupled to the analog input 154. The conversion routine subtracts the auto-zero calibration constant located in the scratch pad RAM from the digital value. The conversion subroutine then addresses the look-up table 132 with the digital value minus the auto-zero calibration value. The conversion subroutine receives a T-Buoy value from the look-up table 132.

The conversion subroutine then adds the calibration offset value stored in scratch pad RAM of the microcontroller 94 from the T-Buoy value. The conversion subroutine then searches the look-up table 132 for the T-Buoy value plus the calibration offset value (the new T-Buoy value). When the conversion subroutine finds the new T-Buoy value (or the closest value) in the look-up table 132, the conversion subroutine retrieves the count value which corresponds to the new T-Buoy value. Preferably, the program searches for the new T-Buoy value in both directions to provide minimal delay. The count value is loaded into the internal timer in the microcontroller 127.

The timer in the microcontroller 127 outputs a square wave frequency at the output 158 as the display signal in response to the count value. The frequency of the square wave is supplied to the display driver 130 which in turn moves the needle 160 of the display 54. Thus, the proper speed is indicated in response to the frequency of the display signal at the output 158. Preferably, 1 Hz is equal to a one degree movement of the needle 160 on the display 54. Preferably, the conversion subroutine continuously reads the digital value from the internal A/D converter. The digital value is continuously converted to a display signal as described above.

The conversion subroutine also generates the calibration offset value. The calibration offset value is generated from pulse signals at the input 148 from the momentary switch 150 and pulse signals at the input 149 from the momentary switch 151. The switches 150 and 151 provide the capability to shift the MPH speedometer readings either upward or downward. Each pulse signal from the switches 150 and 151 represents a particular adjustment to the T-Buoy values in the look-up table 132.

When the momentary switch 150 is pressed, an interrupt is generated and one count is either added or subtracted from the calibration offset value. The new offset value is stored in the serial memory 145 and is loaded into the scratch pad RAM of the microcontroller 127. For example, if the T-Buoy is 849.74 feet from the start buoy and the watercraft 12 travels at 36 MPH, the watercraft 12 should take approximately 16.09 seconds to reach the T-Buoy if the speedometer system 2 is accurate. If the watercraft 12 actually takes 15.99 seconds as measured from an official timing of the watercraft 12, a 0.1 second differential exists between the actual time and the calculated time. The driver of the watercraft 12 would then provide two calibrate up signals at the input 149 from the momentary switch 151 because the system 10 is indicating a speed which is too low. In order to provide a 0.1 second difference, the driver of the watercraft 12 hits the momentary switch 151 twice. In this example, each pulse signal from the momentary switch 151 represents a 0.05 second difference. Thus, after momentary switch 151 is pressed twice, the speedometer system 2 should provide the proper output at the output 158 of the microcontroller 127. The AWSA provides the suggest T-Buoy times, lengths and rates.

Preferably, the calibration procedure discussed above is repeated to ensure accurate adjustment of the speedometer system 2. The conversion program adds the pulse signals representing the difference between the actual time and the calculated time and stores the sum as the calibration offset value in the serial memory 145 and the scratch pad RAM of the microcontroller 127. When both switches 150 and 151 are pressed simultaneously, the conversion subroutine stores the calibration offset value as zero in the serial memory 145 and the scratch pad RAM of the microcontroller 127.

The conversion program causes the needle 160 to jump whenever momentary switch 150 or momentary switch 151 is pressed. The needle 160 jumps so that the driver is aware that the switch 150 or 151 has been pressed. The conversion program causes the needle 160 to jump by temporarily adding a constant such as 40 H to the count value before the count value is loaded into the internal counter. The feedback to the driver of the watercraft 12 via a jumping needle 160 is advantageous because lights, LEDs, or other indicators are not needed. Further, lights and LEDs are disadvantageous because they are difficult to read in the glare of the bright sun.

Figure 12:
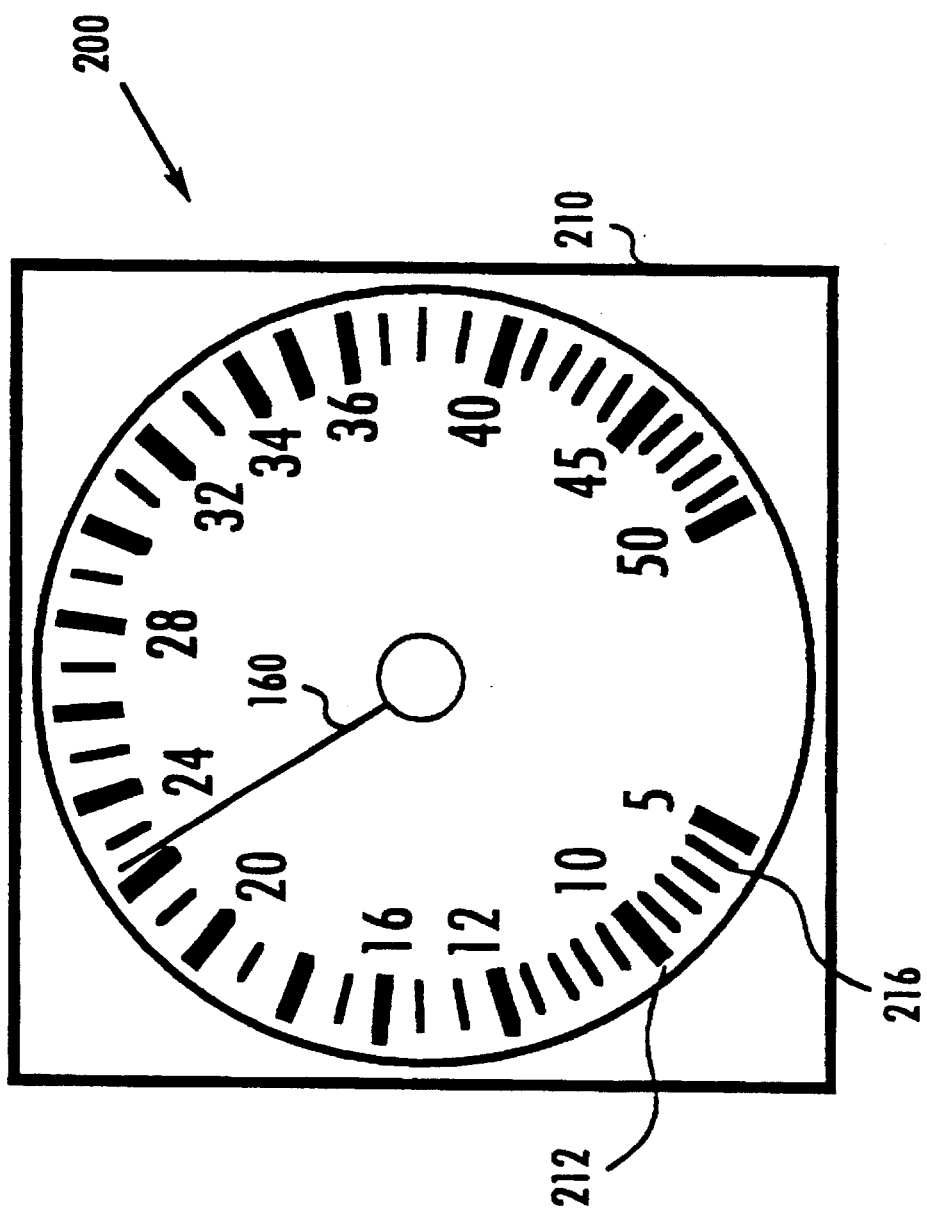
FIG. 12 is a schematic drawing of a face plate for the display employed in the speedometer system.

With reference to FIG. 12, a background dial, background plate, or face plate 200 for the display 54 in accordance with a preferred exemplary embodiment of the present invention is shown. Preferably, a background 210 of the face plate 200 is flat black. The size and color of the hash marks 212 and 216 provide maximum readability for the driver for particular waterski applications. The hash marks 216 are the smallest hash marks having a width of 0.050 inches and a length of 0.27 inches. The hash marks 212 are the largest hash marks having a width of 0.075 inches and a length of 0.39 inches. The face plate 200 preferably has a diameter of 3.15 inches.

The hash marks 212 and 216 are placed about the circumference of the face plate 200. The hash marks represent particular speeds in MPH. Table 1 shows the placement and size of the particular hash mark associated with its MPH reference. The size is represented by "L" for large sized hash marks 212 and "S" for small-sized hash marks 216.

TABLE 1

Placement and Size of Hash Marks

| MPH | Angle From "B" (Degrees) | Size | MPH | Angle From "B" (Degrees) | Size | MPH | Angle From "B" (Degrees) | Size |
|---|---|---|---|---|---|---|---|---|
| 5 | 27 | L | 20 | 128.5 | L | 35 | 249.6 | L |
| 6 | 31.3 | S | 21 | 136 | S | 36 | 259.1 | L |
| 7 | 35.6 | S | 22 | 143.5 | S | 37 | 265.7 | S |
| 8 | 39.9 | S | 23 | 151 | S | 38 | 272.3 | S |
| 8 | 44.2 | S | 24 | 158.5 | L | 39 | 278.9 | S |
| 10 | 48.5 | L | 25 | 166 | S | 40 | 285.5 | L |
| 11 | 56 | S | 26 | 173.5 | S | 41 | 290.5 | S |
| 12 | 63.5 | L | 27 | 181 | S | 42 | 295.5 | S |
| 13 | 71 | S | 28 | 188.5 | L | 43 | 300.5 | S |
| 14 | 78.5 | L | 29 | 196.7 | S | 44 | 305.5 | S |
| 15 | 86 | S | 30 | 205 | L | 45 | 310.5 | L |
| 16 | 94.5 | L | 31 | 213.2 | S | 46 | 314.8 | S |
| 17 | 103 | S | 32 | 221.5 | L | 47 | 319.1 | S |
| 18 | 111.5 | L | 33 | 230.8 | S | 48 | 323.4 | S |
| 19 | 120 | S | 34 | 240.2 | L | 49 | 327.7 | S |
|  |  |  |  |  |  | 50 | 332 | L |

For example, the hash mark 212 representative of 10 MPH is 48.5 degrees from line B. The hash mark 216 representative of 6 MPH is 31.3 degrees from line B.

Preferably, the face plate 200 is circular, having hash marks distributed in a non-linear fashion. The non-linear fashion allows the driver to more readily read speeds for particular applications. For example, speeds between 5 and 10 MPH are closer together than speeds from 10 to 15 MPH because operation of the watercraft 12 at speeds between 5 and 10 MPH has little significance for waterskiing applications. However, operation of the boat from 10 to 22 MPH has great importance with respect to trick ski competitions. A waterskier may require speeds within 0.25 MPH tolerance in trick ski competitions. Thus, the hash marks representing 10 to 22 MPH are spread out over a quarter of the circumference of the face plate 200.

Also, the even speeds from 16 to 36 MPH are indicated by large sized hash marks 212 to advantageously indicate slalom competition speeds. The hash marks representing 16 to 36 MPH are spread out over almost half of the circumference. Further, hash marks are located in the upper half of the face plate 200 for maximum readability. Preferably, the numerals are located on a circumference within the placement of the hash marks on the face plate 200.

The look-up table 132 is preferably programmed to accommodate the non-linear positions of the hash marks. The microcontroller 127 (FIG. 11) preferably provides the display signal so that the driver 130 causes the needle 160 indicates the appropriate speed of the base plate 200. Alternatively, the microcontroller 127 could provide the display signal in a linear fashion and a mechanical adjustment could be made to accommodate the non-linear positions of the hash marks.

The hash marks on the face plate 200 are also color coded so that the driver may easily spot the particular speeds for the particular application. Preferably, the hash marks associated with 30 MPH and 35 MPH are colored orange. These speeds are generally associated with ski jumping competitions. All other hash marks are colored green. Preferably, the needle 160 is colored orange and is pivoted in the center of the face plate 200. All numerals are advantageously colored white to provide superior readability. Readability of the face plate 200 is very important because the driver must operate at precise speeds in an environment including a glaring sun and spraying water.

Figure 13:
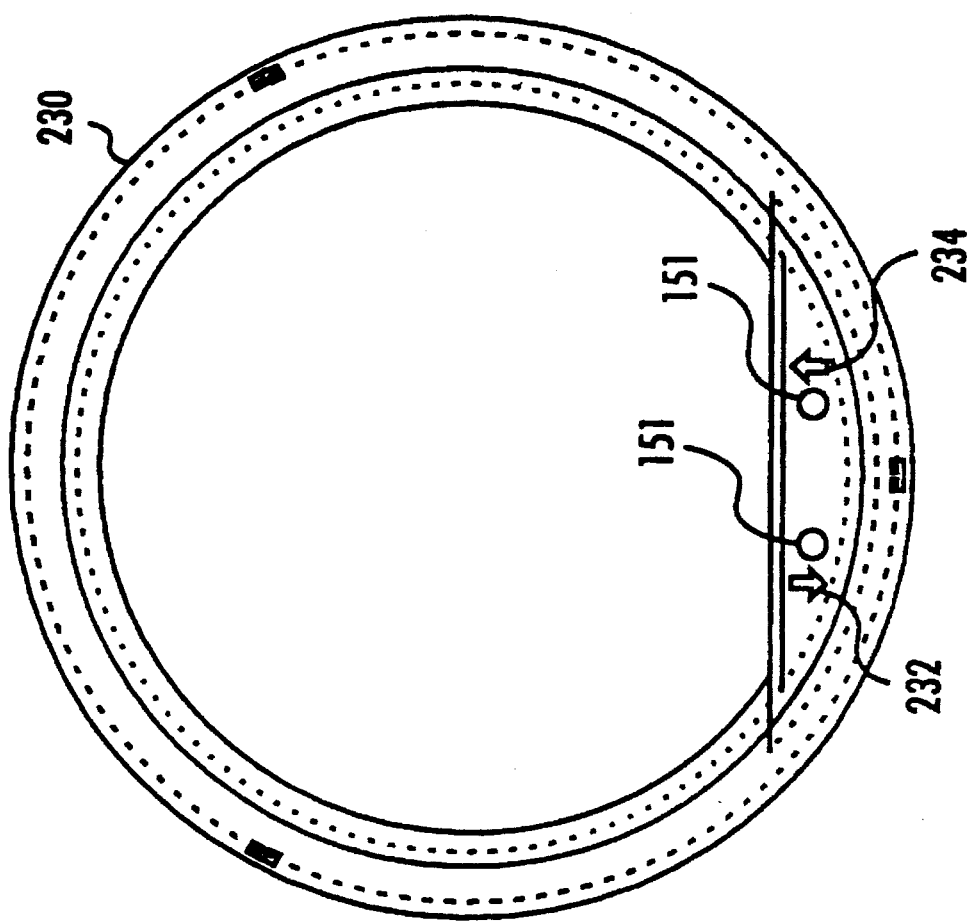
FIG. 13 is a schematic drawing of a speedometer cover for fitting over the face plate employed in the speedometer system.

FIG. 13 is a schematic drawing of a speedometer cover 230 for filtering over the face plate 200 employed in a preferred exemplary embodiment of the present invention. The cover 580 includes the momentary switch 150 and the momentary switch 151. The switches 151 and 150 are coupled to increase speed input 149 and decrease speed input 148, respectively, discussed with reference to FIG. 11. A solid arrow 234 indicating an increase speed input is next to the switch 151, and an outlined arrow 234 indicating a decrease speed input is located next to the switch 151. The switches 150 and 151 are preferably located on the bottom of the cover 230 to avoid interference with the reading of the speed. Preferably, microcontroller 127 causes the needle 160 to jump when the switches 150 and 151 are pressed so that the driver is aware that the system 2 has received the pulse signal. The pressing of the switches 150 and 151 provides pulse signals to the microcontroller 127.

It will be understood that while the various conductor/connectors may be shown in the drawings or described in the specification as single lines or conductors, they are not shown or discussed in any limiting way since they may comprise plural conductors/connectors as understood in the art. Further, the above description is of a preferred exemplary embodiment of the present invention; the present invention is not limited to the specific forms shown. For example, a microprocessor or other control circuit, rather than a microcontroller, may be used and the microcontroller may be programmed in various ways. Further still, an algorithm may be used to compute the speed of the vessel rather than a look-up table. The software or program disclosed in Appendix A is shown as an example of the preferred embodiment and is not shown in a limiting fashion. These and other modifications may be made in the design and arrangement of the elements discussed herein without departing from the scope of the invention as expressed in the appended claims.

We claim:

1. A velocity detection device configured for insertion into a fluid to provide an output proportional to the relative velocity of the detection device with respect to the fluid, the detection device comprising:

a streamlined body portion having an upper end, a lower end, a front edge, a back edge, and a pair of sides extending from the front edge to the back edge, wherein the fluid flows past the streamlined body portion generally from front edge to back edge;

a conduit extending through the streamlined body portion from the upper end generally towards the lower end and terminating at an orifice exposed to the fluid;

a pressure transducer coupled to the conduit at the upper end, wherein the pressure in the conduit increases as the relative velocity increases and the pressure transducer provides an output proportional to the pressure; and a channel disposed along the front edge of the lower end, the channel having an upper arcuate region, wherein the orifice is located in the upper arcuate region.

2. The velocity detection device of claim 1, wherein the sides each include a tapered region which tapers inwardly to the back edge, the back edge being generally pointed.

3. The velocity detection device of claim 2, wherein the front edge is generally rounded.

4. The velocity detection device of claim 3, further comprising a longitudinal axis extending through the upper end and the lower end, the longitudinal axis being disposed at an angle between 10° and 65° from vertical.

5. The velocity detection device of claim 4, wherein the lower end trails the upper end as the fluid flows past the streamlined body portion.

6. The velocity detection device of claim 1, wherein the front edge extends in an arcuate path from the upper end to the lower end to provide a narrower body portion between the front edge and the back edge at the lower end than at the upper end.

7. The velocity detection device of claim 6, wherein the conduit includes a first conduit portion extending at least partially through the body portion generally parallel with the longitudinal axis and a second conduit portion extending between the orifice and the first conduit portion.

8. The velocity detection device of claim 1, further comprising a housing integral with and disposed at the upper end of the body portion, the housing having a chamber configured to receive the pressure transducer.

9. The velocity detection device of claim 8, further comprising a mounting bracket pivotably attached to the housing to facilitate attachment of the velocity detection device to a mounting surface.

10. The velocity detection device of claim 9, further comprising an amplifier to amplify the output signal, the amplifier being operably connected to the pressure transducer and disposed in the housing chamber.

11. The velocity detection device of claim 10, further comprising an adjustment shim having a wedge shape, the adjustment skim being configured for insertion between the mounting bracket and the mounting surface.

12. An apparatus for measuring the speed of a watercraft relative to the water through which it travels, the apparatus providing an electrical output to a speedometer device proportional to the relative speed of the watercraft, the apparatus comprising:

a streamlined body portion configured to extend at least partially below the water line, the body portion having an upper end, a lower end, a front edge, a back edge, and a pair of sides extending from the front edge to the back edge, wherein the water generally flows past the sides from the front edge to the back edge when the watercraft moves relative to the water;

a conduit extending through the streamlined body portion from the upper end generally towards the lower end and terminating at an orifice disposed in proximity to the front edge where it is exposed to the water when the streamlined body portion is inserted into the water;

a pressure transducer coupled to the conduit at the upper end of the body portion, the pressure transducer providing the electrical output proportional to the pressure in the conduit;

a housing integral with the streamlined body portion and disposed at the upper end thereof, the housing including a chamber configured to receive the pressure transducer;

a channel disposed along the front edge wherein the channel has an upper arcuate region and the orifice is located in the upper arcuate region of the channel; and a mounting bracket connected to the housing to mount the housing and the body portion to the watercraft so the body portion may extend beneath the water line a sufficient distance to cover the orifice when the watercraft is moving, wherein the sides of the body portion each include a tapered region which tapers inwardly to the back edge, the back edge being generally pointed, wherein the front edge of the body portion is generally rounded, and wherein the lower end of the body portion trails the upper end as the fluid flows past the streamlined body portion.

13. The apparatus of claim 12, wherein the channel is disposed in the front edge of the lower end, the channel having an upper arcuate region, wherein the orifice is located in the upper arcuate region.

14. The apparatus of claim 13, wherein the front edge extends in an arcuate path from the upper end to the lower end to provide a narrower body portion between the front edge and the back edge at the lower end then at the upper end.

15. The apparatus of claim 14, further comprising an amplifier to amplify the output signal, the amplifier being operably connected to the pressure transducer and disposed in the housing chamber.

16. The apparatus of claim 15, further comprising an adjustment shim having a wedge shape, the adjustment skim being configured for insertion between the mounting bracket and a mounting surface of the housing.

17. In a marine speedometer system including a velocity detection device and an electrical display, the velocity detection device being configured for insertion into a fluid to provide an electrical output representative of the relative velocity of the detection device with respect to the fluid, the electronic display being remote from the velocity detection device and displaying the relative velocity in response to the electrical output, the velocity detection device comprising:

a body portion having an upper end, a lower end, a front edge, back edge, and a pair of sides extending from the front edge to the back edge, wherein the fluid flows past the body portion from the front edge to the back edge, the body portion including an orifice located at a first location in the body portion, wherein the fluid flows past the orifice, the body portion having a channel disposed along the front edge of the lower end, the channel having an upper arcuate region, the orifice being disposed in the upper arcuate region;

a conduit extending through the streamlined body portion from the upper end generally towards the lower end and terminating at the orifice exposed to the fluid; and an electronic pressure transducer located in a second location in the body portion apart from the first location and coupled to the orifice by the conduit extending through the body portion, the electronic pressure transducer being electrically coupled to the electronic display, the electronic pressure transducer being remote from the electronic display, wherein the pressure in the conduit increases as the relative velocity increases and the pressure transducer is configured to produce a signal representative of the pressure in the conduit.

18. The velocity detection device of claim 17, wherein the front edge of the body portion is rounded and the back edge is generally pointed.

19. In a marine speedometer system including a velocity detection device and an electronic display, the velocity detection device being configured for insertion into a fluid to provide an electronic output representative of the relative velocity of the detection device with respect to the fluid, the electronic display being remote from the velocity detection device, the electronic display displaying the relative velocity in response to the electronic output, the velocity detection device comprising:

a body portion having an upper end, a lower end, a front edge, a back edge, and a pair of sides extending from the front edge to the back edge, wherein the fluid flows past the body portion from the front edge to the back edge, the body portion including an orifice located at a first location and a body portion, wherein the fluid flows past the orifice, the body portion having a channel disposed along the front edge of the lower end, the channel having upper arcuate region, the orifice being disposed in the upper arcuate region;

a conduit extending through the streamlined body portion from the upper end generally towards the lower end and terminating at the orifice exposed to the fluid;

an electronic pressure transducer located in a second location in the body portion apart from the first location and coupled to the orifice by the conduit extending through the body portion, wherein the pressure in the conduit increases as the relative velocity increases and the pressure transducer is configured to produce a signal representative of the pressure in the conduit, the electronic pressure transducer being remote from the electronic display; and an electronic amplifier located in the body portion proximate said second location and electrically coupled to the electric pressure transducer, the electronic amplifier being physically proximate the pressure transducer and remote from the electronic display, the electronic amplifier being electrically coupled to the electronic display, the amplifier being configured to amplify the signal produced by the pressure transducer and generate the electric output.

20. The velocity detection device of claim 19, wherein the front edge of the body portion is rounded and the back edge is generally pointed.

* * * * *